K. BRADLEY.
EDUCATIONAL APPLIANCE.
APPLICATION FILED NOV. 24, 1914.
1,189,233.
Patented July 4, 1916.
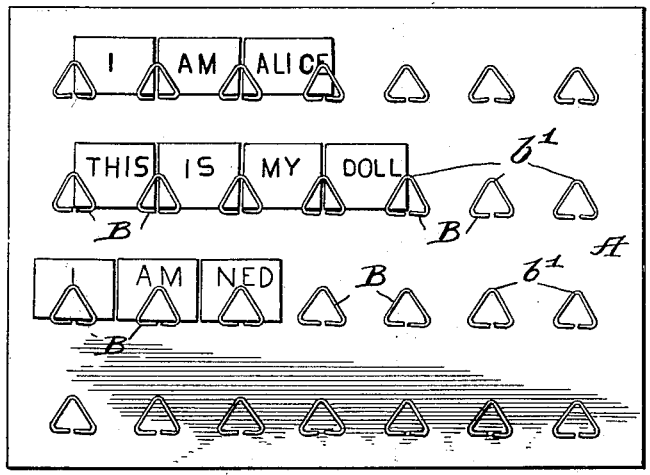
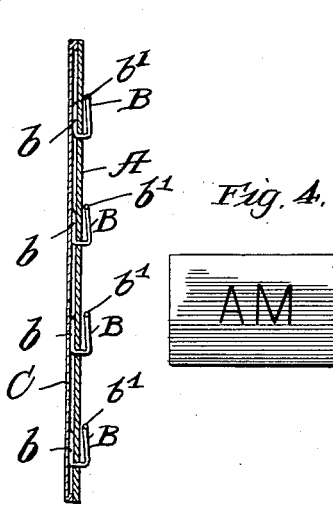
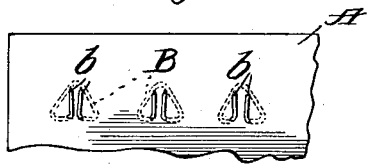
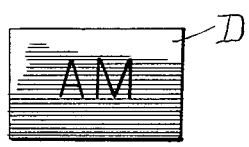
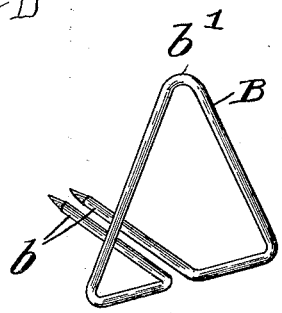
Witnesses:
Inventor:
Katherine Bradley
By _____ Atty

UNITED STATES PATENT OFFICE.

KATHERINE BRADLEY, OF CHICAGO, ILLINOIS.

EDUCATIONAL APPLIANCE.

1,189,233.     Specification of Letters Patent.     Patented July 4, 1916.

Application filed November 24, 1914. Serial No. 873,752.

*To all whom it may concern:*

Be it known that I, KATHERINE BRADLEY, a citizen of the United States, and residing at Chicago, Cook county, Illinois, have invented certain new and useful Improvements in Educational Appliances, of which the following, taken in connection with the drawing, is a description.

My invention has for its object the production of an educational appliance, and relates more specifically to certain improvements in charts, which are designed to be used by pupils learning to read, and which may be used in connection with and accompanying readers and hanging charts.

A further object of my invention is to so construct a hand chart of the class described, by means of which, with a variety of small cards adapted to be used with the chart, each card having a word printed thereon, the pupil may formulate sentences by arranging different cards in the clip holders on the chart to retain them in place.

A further object of my invention is to provide an apparatus of the class described which may be utilized to teach the pupil not only to formulate sentences, but to read them and to arrange the same cards in different order to form sentences expressing different ideas.

In the accompanying drawings, I have illustrated what I now consider the preferred form of my invention, although the details may be carried out in different ways without departing from the spirit thereof, which consists essentially in providing a card of suitable size to be handled by a child, said card being provided with card holding devices arranged in rows whereby the small cards may be held in position in order that the words printed thereon may form sentences. And in these drawings Figure 1 represents the front elevation of the chart; Fig. 2 is a vertical sectional view of the same; Fig. 3 is a fragmentary view of a portion of the chart illustrating the back thereof; Fig. 4 is a detail of one of the cards to be used with the chart; and Fig. 5 is an enlarged perspective view of the preferred form of card holder before being applied to the chart.

Referring to the drawing, A represents a chart preferably formed of a card-board or the like, which forms a base, and which is made of any size suitable for convenience in handling. A plurality of rows of fastening devices are arranged upon this card preferably as shown in Fig. 1, these fasteners comprising wires B, bent to form a triangular-shaped support upon the front of the card, having the ends thereof extending through the card and bent upwardly as shown at *b*, Figs. 2 and 3.

C is a backing of any suitable material covering the same area as the chart body, and being secured thereto in any desired manner, such as by gluing or the like, which completely covers the fastening device at the rear of the chart and prevents any accidents to the fingers of the persons handling the chart.

D is a card, preferably of suitable pasteboard, on which is printed a single word or letter. A number of these cards are arranged to accompany each chart.

In teaching the pupil to formulate sentences or to read, the cards having the words necessary to make a sentence are selected and each in turn placed behind one of the wire holders B, as shown in Fig. 1. The holders B are so arranged that a single card may be held by each holder, or the corners of two cards may be engaged as shown on the upper rows. The matter of arrangement is left to the desire of the pupil.

When the holders B are secured in place with the ends thereof extended through the card-board, the upper ends thereof, or the point of each holder, *b'*, is bent closely to the face of the card, and affords sufficient pressure against the card when placed back of it to secure the same by frictional engagement and prevent it from being displaced until removed by the person using the card.

I claim:

In an educational chart, the combination of a base, triangular-shaped card supports arranged in rows and secured to said base, the apex of each support being bent toward the base, cards arranged between said supports and the base, and held in place by the pressure of the supports against them and the base, and a covering adhesively secured to the back of the base, substantially as described.

In testimony whereof I have signed this specification in the presence of two subscribing witnesses.

KATHERINE BRADLEY.

Witnesses:
ARTHUR B. RUSSELL,
WELLS GOODHUE.

Copies of this patent may be obtained for five cents each, by addressing the "Commissioner of Patents, Washington, D. C."